United States Patent [19]
DeMoss et al.

[11] Patent Number: 5,125,433
[45] Date of Patent: Jun. 30, 1992

[54] SYSTEM FOR ELECTRONICALLY CONTROLLING THE TEMPERATURE OF WATER DELIVERED TO A BATH, SHOWER AND THE LIKE

[76] Inventors: Charles F. DeMoss, 2114 E. 5th St., Anderson, Ind. 46012; Donald E. Willits, 1563 Ken Mar, Wichita, Kans. 67208

[21] Appl. No.: 798,527

[22] Filed: Nov. 26, 1991

[51] Int. Cl.$^5$ .............................................. F16K 11/24
[52] U.S. Cl. ..................... 137/607; 137/456
[58] Field of Search ............... 137/607, 456

[56] References Cited

U.S. PATENT DOCUMENTS

| | | |
|---|---|---|
| 3,370,609 | 2/1968 | Botnick ................... 137/607 |
| 4,220,175 | 9/1980 | Keller, III et al. ........... 137/607 |
| 4,945,943 | 8/1990 | Cogger .................... 137/607 |

Primary Examiner—John K. Ford
Attorney, Agent, or Firm—Jack Schuman

[57] ABSTRACT

A system for selectively delivering cold, lukewarm, warm or hot water to a bath, shower and the like is controlled by water temperature function switches arranged in cascade series at a control panel in order of priority descending to hot water. When a water temperature function switch corresponding to no water flow or water flow at the desired temperature is closed, a low voltage DC signal is sent to logic circuitry which, in turn, sends a low voltage DC signal to appropriate relays which control the operation of solenoid-operated valves, the inlets of which are connected to hot and cold water mains, the outlets of which are connected to a water delivery conduit leading to the bath, shower and the like. The logic circuitry comprises a pulse shaper circuit, a reset pulse circuit and a gate pulse circuit. A flow detector in the water delivery conduit senses when water flow therethrough has ceased, and sends a signal to the reset pulse circuit, which in turn signals the logic circuitry to shut down the system. An optional switch is provided to prevent the delivery of hot water to the water delivery circuit.

9 Claims, 3 Drawing Sheets

SYSTEM FOR ELECTRONICALLY CONTROLLING THE TEMPERATURE OF WATER DELIVERED TO A BATH, SHOWER AND THE LIKE

SUMMARY OF THE INVENTION (1) Field of the Invention:

This invention relates, broadly speaking, to a system for electronically controlling the temperature of water delivered to a bath, shower and the like.

More specifically, this invention relates to a low-voltage system employing solid state electronics and integrated circuit technology to safely control the temperature of water delivered to a bath, shower and the like.

(2) Description of the Prior Art

Conventionally, the temperature of water delivered to a bath, shower and the like is adjusted through the manual operation of valves in hot and cold water lines serving such bath, shower and the like. Such method of temperature adjustment is wasteful of water and energy, usually is time consuming, and under some circumstances may result in the user being scalded by extremely hot water.

It is known to control the temperature of water delivered to a bath, shower or the like by means of switch-operated solenoid valves in the hot and cold water lines. The proximity of full line voltage and water has the potential of catastrophe to the user. Moreover, such system does not provide a fail-safe mode to avoid scalding. There are other shortcomings in such known systems which are avoided in the present invention.

SUMMARY OF THE INVENTION

One of the objects of this invention is to provide an improved system for controlling the temperature of water delivered to a bath, shower and the like.

Another object of this invention is to provide a low voltage DC system for electronically controlling the temperature of water delivered to a bath, shower and the like.

A further object of this invention is to provide a low voltage DC system for electronically controlling the temperature of water delivered to a bath, shower and the like, which system protects the user against high voltage and which can be operated to protect the user from contact with scalding hot water, and which system conserves water and energy.

Other and further objects of this invention will become apparent by reference to the accompanying specification, drawings and appended claims.

Briefly, the foregoing objects may be obtained by providing a low voltage-operated apparatus comprising a control panel with function switches for the "off function" and for water temperatures ranging between cold and hot, wired in cascade series with priorities descending from "off" to "hot", the switch of highest priority producing a DC signal which is communicated to a control/memory section which in turn sends a low voltage DC signal to relays which control the operation of solenoid-operated water valves connected to hot and cold water mains. A key operated switch is provided to prevent the delivery of hot water to the bath, shower or the like.

No method is known to the inventors whereby the temperature of water being delivered to a bath, shower and the like may be electronically controlled, at low DC voltage, so as to permit instant selection and delivery of the water at one of several pre-set desired temperatures, without wasting water and energy, with complete safety to the user, including protection from high voltages and inadvertent scalding, in a cost-effective manner and with apparatus which is simple to install.

DESCRIPTION OF THE DRAWINGS

Referring now to the drawings in which like numerals represent like parts in the several views.

DESCRIPTION OF THE PREFERRED EMBODIMENT

The present invention comprises electronic control and memory module 1 (the outline of which is indicated in dotted lines in FIG. 2A for purposes of clarity) receiving control signal voltage from control panel 2 (the outline of which is indicated in dotted lines in FIG. 2A for purposes of clarity) and generating a control output voltage which is transmitted to valve assembly 3. The inlet of valve assembly 3 communicates with hot water conduit 4 and cold water conduit 5, and the outlet of valve assembly 3 delivers water of the pre-selected temperature to discharge conduit 6 which may lead to a bath, shower or the like.

The system is operated on low-voltage direct current. For this purpose, power supply section 7, shown schematically (in dotted outline for purposes of clarity) in FIG. 2B as being located within electronic control and memory module 1, is provided. Power supply section 7 comprises bridge rectifier 8, 5 volt regulator 9 and 12 volt regulator 10. Bridge rectifier 8 receives 24 volt AC current from the secondary of a step-down transformer 11, the primary of which is connected to 110 volt AC mains through a fused line as shown. The rectified and filtered output of bridge rectifier 8 is divided between two lines, line 12 which is connected to the input of 5 volt regulator 9 and line 13 which is connected to the input of 12 volt regulator 10. Bridge rectifier 8, 5 volt regulator 9 and 12 volt regulator 10 are suitably grounded as shown.

Control panel 2 is, in the preferred embodiment, provided with five function control switches 14, 15, 16, 17 and 18 connected in cascade series. These switches 14, 15, 16, 17 and 18 are preferably of the well-known push button type or of the well-known touch type (momentary contact, tactile, membrane) and, unless activated, are in the off-position as shown schematically in FIG. 2A. Each switch 14, 15, 16, 17 and 18 has an input terminal 19, a first output terminal 20 and a second output terminal 21. The second output terminals 21 of switches 14, 15, 16, 17 and 18 are connected to lines 22, 23, 24, 25 and 26, respectively, leading to electronic control and memory module 1 and whereby a control signal voltage from a selected one of the switches 14, 15, 16, 17 and 18 of the control panel 2 may be communicated to said electronic control and memory module 1 for further processing as hereinafter described.

Figure 1:
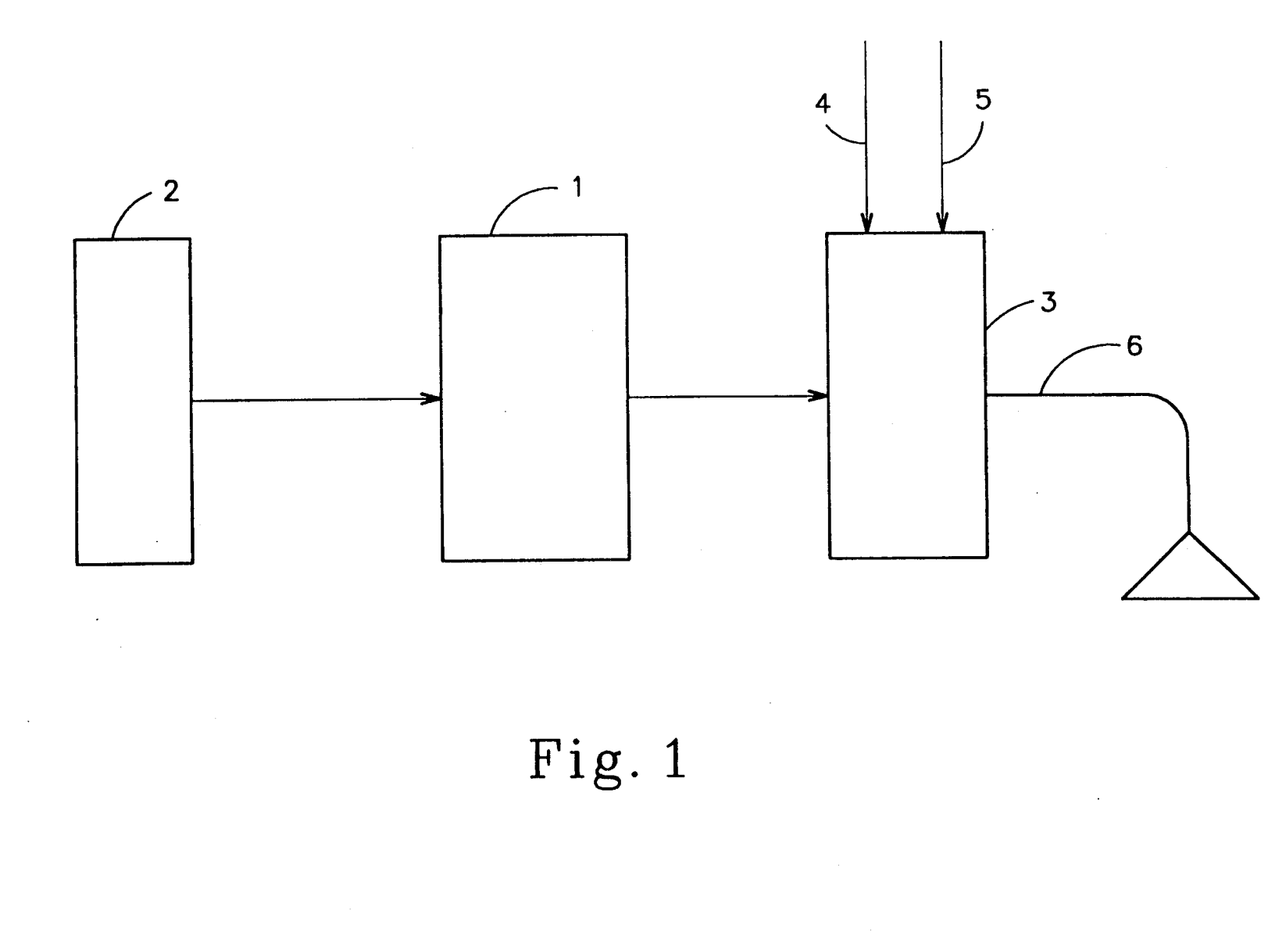
FIG. 1 represents a block diagram of the system.
Figure 2A:
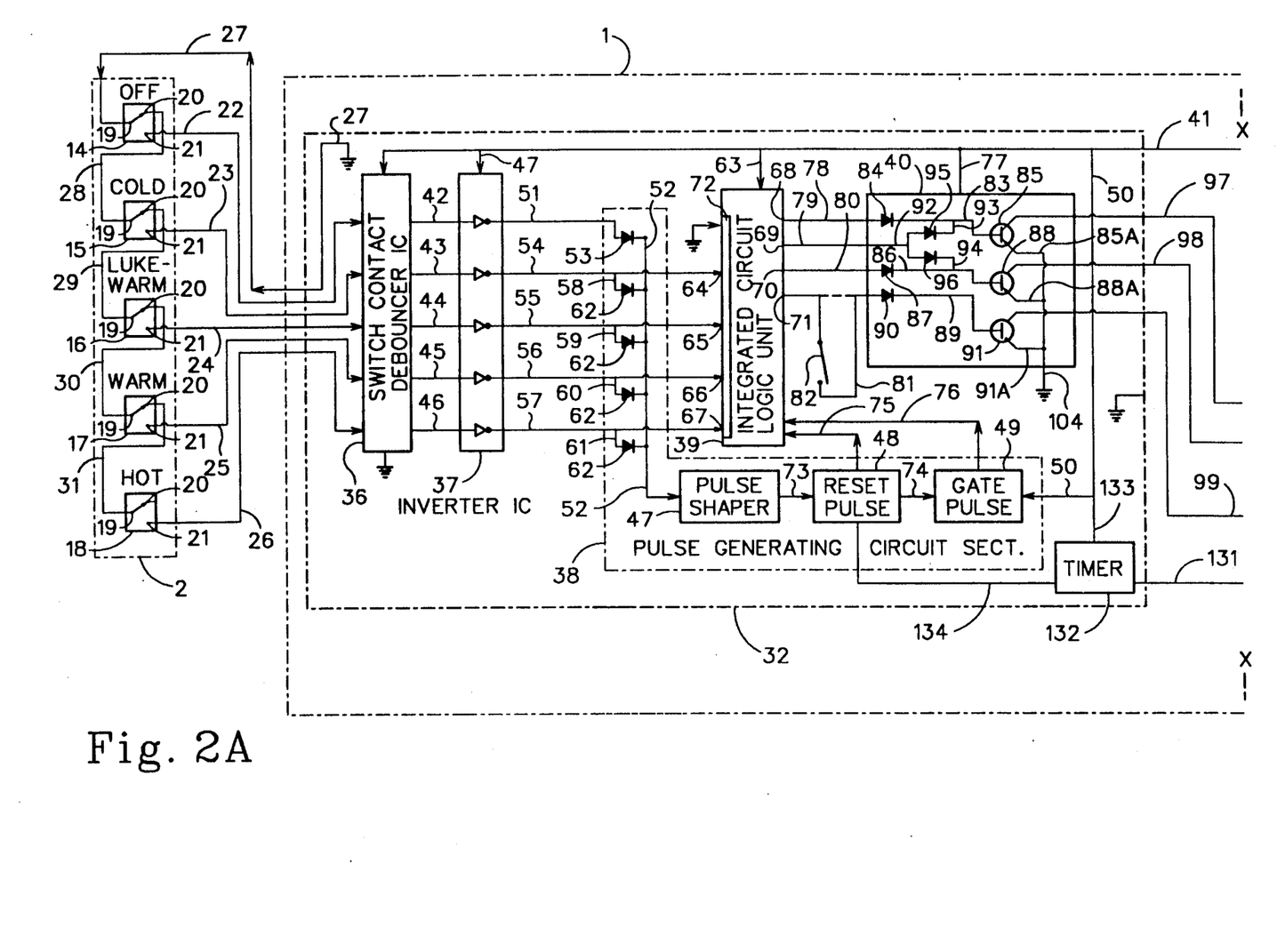
FIGS. 2A and 2B represent an electrical diagram of the system.

Switch 14 provides an "off" function for the entire system.

Switch 15 provides a "cold water temperature" function for the system.

Switch 16 provides a "lukewarm water temperature" function for the system.

Switch 17 provides a "warm water temperature" function for the system.

Switch 18 provides a "hot water temperature" function for the system.

The input terminal 19 of switch 14 is connected through line 27 to ground in electronic control and memory module 1, and as hereinafter described, will receive through this ground connection the +5 volt DC output of 5 volt regulator 9 through switch contact debouncer integrated circuit 36.

The first output terminal 20 of switch 14 is connected to input terminal 19 of switch 15 through line 28.

The first output terminal 20 of switch 15 is connected to input terminal 19 of switch 16 through line 29.

The first output terminal 20 of switch 16 is connected to input terminal 19 of switch 17 through line 20.

The first output terminal 20 of switch 17 is connected to input terminal 19 of switch 18 through line 31.

Switch 18 being the last switch in sequence in the cascade series circuit, its first output terminal 20 is free and unconnected to any line.

In the inactive or non-actuated condition of each switch 14, 15, 16, 17 and 18, its input terminal 19 is connected to its first output terminal 20 as shown in FIG. 2. In the active or actuated condition of each of said switches 14, 15, 16, 17 and 18, the connection between its input terminal 19 and its first output terminal 20 is broken, and its input terminal 19 will be connected to its second output terminal 21.

The cascade series connection of switches 14, 15, 16, 17 and 18 provides switch 14, the "off" function switch, with the highest priority, the priorities of succeeding switches 15, 16 and 17 serially decreasing, and switch 18, the "hot water temperature" switch, having the lowest priority. This arrangement is a safety precaution, and prevents any simultaneous multiple actuation of switches which might cause an undesired or undesirable condition of operation. This cascade series arrangement assures that, in the event of an inadvertent or even deliberate simultaneous actuation of more than one function switch, the control signal voltage from the switch with higher or highest priority will control the system.

It will be apparent, from an examination of the cascade series circuitry that, if switches 14 and 18 are simultaneously actuated, the connection between input terminal 19 and first output terminal 20 of switch 14 will be broken, input terminal 19 of switch 18 receives no ground, and the only control signal voltage emanating from control panel 2 will be a ground signal from switch 14, the "off" function switch, shutting down the system.

Similarly, an examination of the cascade series circuitry will reveal that, if switches 16 and 18 are simultaneously actuated, the connection between input terminal 19 and first output terminal 20 of switch 16 will be broken, input terminal 19 of switch 18 receives no ground, and the only control signal voltage emanating from control panel 2 will be a ground signal from switch 16, the "lukewarm water temperature" switch.

To summarize at this point, if more than one switch is actuated at the same time, and one of those switches is switch 14, the "off" function switch, the system will be shut down. If more than one switch is actuated at the same time, and all of these switches are temperature adjustment switches, only the coolest selected temperature switch will control the system.

In order to accomodate the positioning of control panel 2 and electronic control and memory module 1 at different locations for convenience, lines 22, 23, 24, 25, 26 and 27 may be incorporated in a multi-conductor extension cable with conventional male and female connectors (not shown) as required.

Electronic control and memory module 1 is provided with control/memory section 32 (the outline of which is shown in FIG. 2 in dotted lines for purposes of clarity), and with valve relays 34, 35 and 36.

Control/memory section 32 comprises switch contact de-bouncer integrated circuit 36, inverter integrated circuit 37, pulse generating circuit section 38 (the outline of which is shown in FIG. 2 in dotted lines for purposes of clarity), integrated circuit logic unit 39, and water valve logic and driver circuitry section 40, and is grounded as indicated diagrammetrically.

Switch contact de-bouncer integrated circuit 36 functions to clean up contact noise resulting from the operation of switches 14, 15, 16, 17 and 18 at control panel 2 and to suppress extraneous electrical interference, which might adversely affect the operation of the system. In effect, switch contact de-bouncer integrated circuit 36 is a damper which eliminates voltage spikes that may occur during opening or closing of the switches 14, 15, 16, 17 and 18. Switch contact de-bouncer integrated circuit 36 is a readily available "off the shelf" item manufactured by Motorola Co. and sold by them as their Model No. MC 14490.

Lines 22, 23, 24, 25 and 26, from switches 14, 15, 16, 17 and 18, respectively, are connected to the input side of switch contact de-bouncer integrated circuit 36.

Figure 2B:
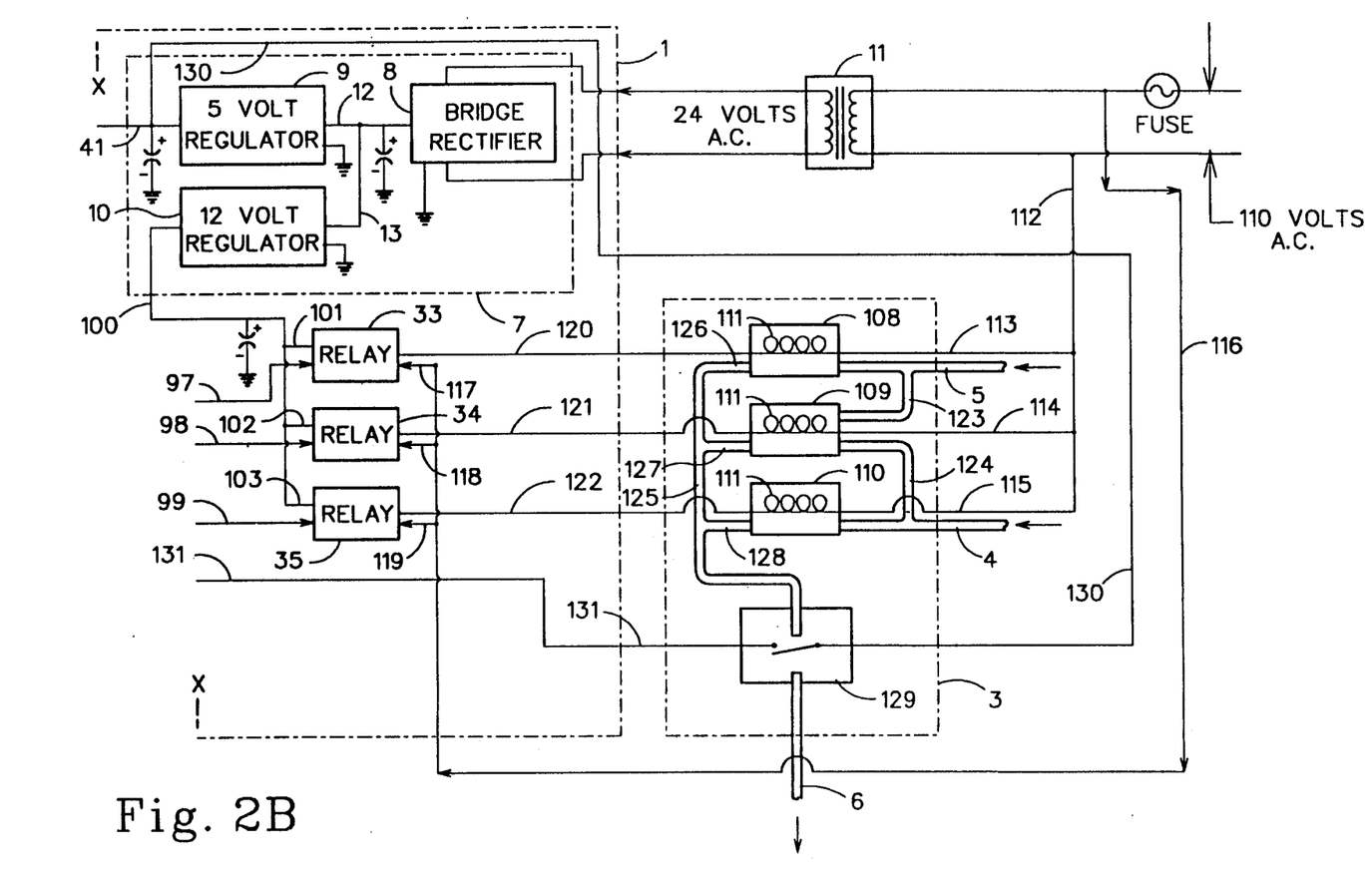

Line 41 from the output of 5 volt regulator 9, grounded through a capacitor as shown, delivers +5 volts to operate switch contact de-bouncer 36, which is grounded as shown.

Switches 14, 15, 16, 17 and 18 operate through switch contact de-bouncer integrated circuit 36 to produce control voltage level transitions which are reversed from what integrated circuit logic unit 39, pulse generating circuit section 38 and subsequent circuitry are designed to operate. For this reason, inverter integrated circuit 37 is employed.

Lines 42, 43, 44, 45 and 46, corresponding respectively to switches 14, 15, 16, 17 and 18, are connected from the output side of switch contact de-bouncer integrated circuit 36 to the input side of inverter integrated circuit 37.

Inverter integrated circuit 37 is a readily available "off the shelf" item manufactured by Texas Instruments and sold by them as their Model No. 7404.

Line 47 connected to line 41, in turn connected to the output of 5 volt regulator 9, delivers +5 volts to operate inverter integrated circuit 37, which is grounded as shown.

Pulse generating circuit section 38 comprises pulse shaper circuit 47, reset pulse circuit 48, and gate pulse circuit 49 (all of which are well-known in the art and are which may be assembled with components which are readily available as "off the shelf" items), and is powered by line 50 connected to the +5 volt DC line 41 from 5 volt regulator 9.

Line 51, corresponding to switch 14, is connected between the output side of inverter integrated circuit 37 and line 52 through diode 53.

Lines 54, 55, 56 and 57, corresponding respectively to switches 15, 16, 17 and 18, are connected between the output side of inverter integrated circuit 37 and the input side of integrated circuit logic unit 39.

Lines 58, 59, 60 and 61 are connected respectively from lines 54, 55, 56 and 57 to line 52 through diodes 62.

Diodes 53 and 62, well-known in the art and readily available as "off the shelf" items, permit current flow to line 52 but not in the reverse direction.

Integrated circuit logic unit may be the No. 7496 5 bit shift register TTL ("transistor-transistor-logic") element regularly available as an "off the shelf" item manufactured and sold by Texas Instruments as their Model No. 7496.

Line 63 connected to line 41, in turn connected to the output of 5 volt regular 9, delivers +5 volts to operate integrated circuit logic unit 39 which is grounded as shown.

Integrated circuit logic unit has four inputs 64, 65, 66 and 67 corresponding respectively to switches 15, 16, 17 and 18, and four outputs 68, 69, 70 and 71 corresponding respectively to switches 15, 16, 17 and 18. Memory circuit 72 is functionally positioned between the inputs 64, 65, 66 and 67, and the outputs 68, 69, 70 and 71. Due to the logic circuitry functionally interposed between the inputs 64, 65, 66 and 67 and the memory circuit 72, the memory circuit 72 will be presented with one of two voltage levels or states from each of inputs 64, 65, 66 and 67, viz. a normal logic low level of 0 volts and a logic high level of +5 volts.

When a particular function control switch 14, 15, 16, 17 or 18 at control panel 2 is actuated so as to connect its input terminal 19 with its second output terminal 21, such actuation disconnects the input terminal 19 of switches with lower priority from ground, line 27 due to the cascade series arrangement of switches at control panel 2. Actuation of a particular function control switch 14, 15, 16, 17 or 18 simultaneously sends a +5 volt DC signal to line 52. Thus, if switch 14 is the controlling switch, actuated to the "on" position (input terminal 19 connected to second output terminal 21), switch 14 will, through line 22, switch contact de-bouncer integrated circuit 36, line 42, inverter integrated circuit 37, line 51, and diode 53, send a +5 volt DC signal to line 52.

Similarly, if switch 15 is the controlling switch, actuated to the "on" position, switch 15 will, through line 23, switch contact de-bouncer integrated circuit 36, line 43, inverter integrated circuit 37, line 54, line 58 and diode 62, send a +5 volt DC signal to line 52.

The routes through which any one of switches 16, 17 and 18, when actuated to the "on" position, send a +5 volt DC signal to line 52 can similarly be traced.

The +5 volt DC signal generated by any one of switches 14, 15, 16, 17 and 18 at control panel 2 is fed through line 52 to pulse shaper circuit 47, whereupon pulse shaper circuit 47 signals, through line 73, reset pulse circuit 48 to generate a reset pulse and, through line 74, signals gate pulse circuit 49 to generate a gate pulse.

The reset pulse generated by reset pulse circuit 48 of pulse generating circuit section 38 is communicated through line 75 to the memory circuit 72 of integrated circuit logic unit 39 to clear the memory of its previous state so as to cancel all previously held instructions from the switches 14, 15, 16, 17 and 18 of control panel 2. After such clearance of the memory of integrated circuit logic unit 39, the gate pulse circuit 49 of pulse generating circuit section 38 generates a gate pulse which is communicated through line 76 to integrated circuit logic unit 39. This gate pulse enables the new voltage levels (of which there are only two, one being the low or zero volt level and the other being the high or +5 volt DC level), corresponding to the desired water temperature of the bath, shower or the like, at the several inputs in the integrated circuit logic unit 39 to be transferred to the memory circuit 72 of the said integrated circuit logic unit 39. Due to the cascade series arrangement of switches 14, 15, 16, 17 and 18 at the control panel 2, there will be only one high or +5 volt DC level input, the other inputs being at the low or zero volt level. The memory circuit 72 of integrated circuit logic unit 39 stores the signals from switches 14, 15, 16, 17 and 18 of control panel 2 until new instructions from switches 14, 15, 16, 17 and 18 are received. This feature eliminates any need for mechanical interlocking type push button switches to retain or hold the selected function (water temperature desired in the bath, shower or the like), and is a distinct advantage because of the potential for switch failure or electriCal shock hazard when mechanical switches are intimately associated with electricity, water and people.

Each of the four outputs 68, 69, 70 and 71 from integrated circuit logic unit 39 corresponds with a particular one of input lines 64, 65, 66 and 67 connected to the input side of integrated circuit logic unit 39 and thus corresponds with a particular one of function control switches 15, 16, 17 and 18 at control panel 2. Specifically, output 68 corresponds with function control switch 15 (the "cold water temperature" switch), output 69 corresponds with function control switch 16 (the "lukewarm water temperature" switch), output line 70 corresponds with function control switch 17 (the "warm water temperature" switch), and output line 71 corresponds with function control switch 18 (the "hot water temperature" switch).

Water valve logic and driver circuitry section 40 is of the "diode logic" type readily available as "off the shelf" components manufactured by Motorola and sold by them as their Model No. 1N 4148.

Line 77 connected to line 41, in turn connected to the output of 5 volt regulator 9, delivers +5 volts to operate water valve logic and driver circuitry section 40, which is grounded as shown.

Lines 78, 79 and 80 directly connect the respective outputs 68, 69 and 70 of integrated circuit logic unit 39 to the input side of water valve logic and driver circuit section 40, and correspond respectively with switches 15, 16 and 17 on control panel 2.

Line 81 connects the output 71 of integrated circuit logic unit 39, corresponding to "hot water temperature" switch 18 on control panel 2, to the input side of water valve logic and driver circuitry section 40 through switch 82. Switch 82 in line 81 provides the option of preventing the delivery of hot water, which may be of scalding temperature, through discharge conduit 6 to the bath, shower or the like so as to avoid injury to the user. Switch 82 may be key operated and conveniently located so as to place its operation under the care of a responsible custodian. If this feature is not desired, switch 82 may be dispensed with, in which event line 81 will directly connect output 71 of integrated circuit logic unit 39 with the input side of water valve logic and driver circuitry section 40 as indicated by the dotted line between output 71 of integrated circuit logic unit 39 and the input side of water valve logic and driver circuitry section 40.

Water valve logic and driver circuitry section 40 is shown diagrammatically as comprising line 83 with diode 84 therein and connected at one end to line 78 and at the other end to the base of transistor 85, line 86 with diode 87 therein and connected at one end to line 80 and at the other end to the bases of transistor 88, line 89 having diode 90 therein and connected at one end to line 81 and at the other end to the base of transistor 91, and line 92 connected at one end to line 79 and divided into two lines 93 and 94 at the other end, line 93 with diode 95 therein and connected to line 83, and line 94 with diode 96 therein and connected to line 86.

Diodes 84, 87, 90, 95 and 96 are positioned in their respective lines 83, 86, 89, 93 and 94 in such manner as to permit current flow from the input side to the output side of water valve logic and driver circuitry section 40 but not in the reverse direction.

Lines 97, 98 and 99 are connected at one end thereof to the collectors of transistors 85, 88 and 91, respectively, and at the other end thereof to valve relays 33, 34 and 35, respectively. The emitters of transistors 85, 88 and 91 are connected through lines 85a, 88a and 91a, respectively, to ground through line 104, as shown. This arrangement provides a higher degree of current conduction than the output of the logic circuitry, thereby driving relays 33, 34 and 35 with much stronger capability.

Line 100 from the output of 12 volt regulator 10, grounded through a capacitor as shown, delivers +12 volts to operate relays 33, 34 and 35 through lines 101, 102 and 103 respectively.

Valve assembly 3 comprises solenoid-operated valves 108, 109 and 110, each having a solenoid 111 working on 110 volts AC. Solenoid valve 109 is a mixing valve adapted to receive hot water from hot water conduit 4 and cold water from cold water conduit 5, through two inlets diagramatically shown in FIG. 2, and to deliver water of thermostatically controlled intermediate temperature from its outlet.

Line 112, connected to one side of the 110 volt mains upstream of step-down transformer 11, communicates through lines 113, 114 and 115 with one side of the solenoids 111 in solenoid-operated valves 108, 109 and 110 respectively.

Line 116, connected to the other side of the 110 volt mains upstream of step-down transformer 11, communicates through lines 117, 118 and 119 with one side of the outputs of relays 33, 34 and 35, respectively.

Lines 120, 121 and 122 communicate between the other side of the outputs of relays 33, 34 and 35, respectively, and the other side of solenoids 111 in solenoid-operated valves 108, 109 and 110, respectively.

Cold water conduit 5 communicates with the inlet of solenoid-operated valve 108, and has a branch conduit 123 communicating with an inlet of solenoid-operated mixing valve 109.

Hot water conduit 4 communicates with the inlet of solenoid-operated valve 110, and has a branch conduit 124 communicating with an inlet of solenoid-operated mixing valve 109.

Header conduit 125 communicates, through conduits 126, 127 and 128, with the outlets of solenoid-operated valves 108, 109 and 110, and leads to the inlet of flow detector 129. The outlet of flow detector 129 is connected to discharge conduit 6.

Flow detector 129, powered by line 130 connected to the 5 volt DC line 41 from 5 volt regulator 9, is a conventional device comprising a motion-sensing element and a switch actuated by the motion-sensing element.

The circuit through flow detector 129 continues through line 131 to the input of timer circuit section 132.

Timer circuit section 132 is a regularly available, off the shelf item manufactured by Motorola and sold by them under their Model No. 555, and is powered by line 133 connected to line 50, which in turn is connected to the +5 volt DC line 41 from 5 volt regulator 9.

The output of timer circuit section 132 is communicated to reset pulse subsection 48 through line 134.

In the event water ceases to flow through conduit 6, or flows so slowly as to be tantamount to no flow at all (as in the case of a leak), the motion-sensing element in flow detector 129 actuates its switch, sending a signal through line 131 to start the operation of timer 132. After the passage of a preset period of time from the moment that the motion-sensing element in flow detector 129 first detects a no-flow situation, timer circuit section 132 sends a signal through line 134 to reset pulse circuit 48, triggering a reset pulse which passes through line 75 to clear the memory of memory circuit 72 of integrated circuit logic unit 39 and shut off the water valves. This feature prevents any possible overheating of valves and wear of valve assemblies and related components, and also conserves electricity and water.

The operation of the systems should be evident from the figures and specification.

When switch 14 (the "off" function switch) is actuated no water will flow through any of the solenoid-operated valves 108, 109 and 110, and the system is entirely closed down.

When switch 15 (the "cold water temperature" switch) is actuated, a signal is transmitted through lines 78, 83 and 97 to operate relay 33 thereby closing the circuit through solenoid 111 of solenoid-operated valve 108 and opening the said valve 108, permitting cold water to flow from conduit 5, through solenoid-operated valve 108, conduit 126, header conduit 125, flow detector 129 and discharge conduit 6.

When switch 16 (the "lukewarm water temperature" switch) is actuated, a signal is transmitted through lines 79, 93, 94, 97 and 98 to operate relays 33 and 34, thereby closing the circuits through solenoids 111 of solenoid-operated valves 108 and 109, thereby opening the said valves 108 and 109. With valve 108 open, cold water will flow from conduit 5 through solenoid-operated valve 108 and conduit 126 into header conduit 125. With valve 109 open, cold water and hot water will flow from conduits 123 and 124 respectively through solenoid-operated valve 109, mixing therein to produce warm water which then flows through conduit 127 into header conduit 125. Cold water from conduit 126 and warm water from conduit 127 will mix in header conduit 125 to produce lukewarm water which then flows through flow detector 129 into discharge conduit 6.

When switch 17 (the "warm water temperature" switch) is actuated, a signal is transmitted through lines 80, 86 and 98 to operate relay 37, thereby closing the circuit through solenoid 111 of solenoid-operated valve 109 thereby opening the said valve 109. With valve 109 open, cold water and hot water will flow from conduits 123 and 124 respectively through valve 109, mixing therein to produce warm water which then flows through conduit 125 into header conduit 125 and through flow detector 129 into discharge conduit 6.

When switch 18 (the "hot water temperature" switch) is actuated, and switch 82 in line 81 is closed, a signal is transmitted through lines 81, 89 and 99 to operate relay 35, thereby closing the circuit through solenoid 111 of solenoid-operated valve 110 thereby opening the said valve 100. With valve 110 open, hot water will flow from conduit 4 through solenoid-operated valve 110, conduit 128, header conduit 125, and flow detector 129 into discharge conduit 6. If switch 82 is open, no hot water will flow through discharge conduit 6.

Typically, with hot water at 140° F. and cold water at 55° F., switch 15 will produce water at 55° F., switch 16 will produce water at approximately 80°-85° F., switch 17 will produce water at approximately 110° F., and switch 18 will produce water at 140° F.

Various adjustments can be made to the system, particularly in the sizing of valves and conduits, to produce lukewarm and warm waters of different temperatures then those heretofore given by way of example.

It will be seen that we have invented a system whereby the temperature of water being delivered to a bath, shower and the like may be electronically controlled, at low voltage, so as to permit instant selection and delivery of the water at one of several pre-set desired temperatures, without wasting water and energy, with complete safety to the user, including protection from high voltages and inadvertent scalding.

The foregoing specification is illustrative of the principles of the invention. Since modifications and changes may readily occur to those skilled in the art to which this invention pertains, which modifications and changes will not depart from the spirit of the invention, this invention should not be considered as limited to the exact apparatus shown and described herein, and the appended claims should be construed as covering suitable modifications and equivalents.

We claim:

1. Low voltage-operated apparatus adapted to electronically control the delivery of water from a hot water conduit and a cold water conduit so as to selectively provide cold water, lukewarm water, warm water or hot water to a conduit serving a bath, shower and the like, said apparatus comprising:
    (a) electrical power means having a low voltage DC output,
    (b) a control panel comprising:
        (i) an off function switch,
        (ii) a cold water temperature function switch,
        (iii) a lukewarm water temperature function switch,
        (iv) a warm water temperature function switch,
        (v) a hot water temperature function switch,
    (c) first wiring means to electrically connect said function switches in cascade series, said off function switch having the highest priority over all other function switches, said hot water temperature function switch having the lowest priority of all other function switches, said cold water temperature function switch having lower priority than said off function switch, said lukewarm water temperature function switch having lower priority than said cold water temperature function switch, and said warm water temperature function switch having lower priority than said lukewarm water temperature function switch,
    (d) second wiring means electrically connecting said control panel to the low voltage DC output of said electrical power means,
    (e) a memory circuit comprising:
        (i) a first input electrically connected to said cold water temperature function switch,
        (ii) a second input electrically connected to said lukewarm water temperature function switch,
        (iii) a third input electrically connected to said warm water temperature function switch,
        (iv) a fourth input electrically connected to said hot water temperature function switch,
    (f) an integrated circuit logic unit comprising
        (i) a first output associated with said first input of said memory circuit,
        (ii) a second output associated with said second input of said memory circuit,
        (iii) a third output associated with said third input of said memory circuit,
        (iv) a fourth output associated with said fourth input of said memory circuit,
        said integrated circuit logic unit being adapted to produce zero voltage or alternatively a low voltage signal to said outputs depending upon which function switch of highest priority is closed,
    (g) a pulse shaper circuit electrically connected to all of said function switches and adapted to generate an electrical signal upon closing of any of said function switches,
    (h) a reset pulse circuit electrically connected to said pulse shaper circuit and adapted to generate an electrical reset pulse in response to an electrical signal from said pulse shaper circuit,
    (i) a gate pulse circuit electrically connected to said pulse shaper circuit and adapted to generate an electrical gate pulse in response to an electrical signal from said pulse shaper circuit,
    (j) third wiring means electrically connected to the low voltage DC output of said electrical power means and powering said memory circuit, integrated circuit logic unit, pulse shaper circuit, reset pulse circuit and gate pulse circuit,
    (k) fourth wiring mean electrically connecting said reset pulse circuit and said memory circuit and adapted to communicate to said memory circuit an electrical reset pulse generated by said reset pulse circuit to clear the memory circuit of its previous state,
    (l) fifth wiring means electrically connecting said gate pulse circuit and said integrated circuit logic unit and adapted to communicate to said integrated circuit logic unit an electrical gate pulse generated by said gate pulse circuit,
    (m) said integrated circuit logic unit, upon receipt of said electrical gate pulse, permitting a voltage signal generated by closing of a particular function switch to be transferred to that input of said memory circuit associated with the said particular function switch,
    (n) a first electrical relay,
    (o) a second electrical relay,
    (p) a third electrical relay,
    (q) sixth wiring means electrically connected to the low voltage DC output of said electrical power means and powering said first, second and third relays,
    (r) seventh wiring means electrically connecting the first output of said integrated circuit logic unit with said first relay, whereby upon closing of said cold water temperature function switch said first relay is operated, (s) eighth wiring means electrically connecting the third output of said integrated circuit logic unit with said second relay, whereby upon closing of said warm water temperature function switch said second relay is operated, (t) ninth wiring means electrically connecting the second output of said integrated circuit logic unit with said seventh and eighth means, whereby upon closing of said lukewarm water temperature function switch, said first and second relays are operated, (u) tenth wiring means electrically connecting the fourth output of said integrated circuit logic unit with said third relay, whereby upon closing of said hot water temperature function switch, said third relay is operated, (v) a first solenoid-operated water valve, (w) a second solenoid-operated water valve, (x) a third solenoid-operated water valve, (y) eleventh wiring means electrically connecting the output of said first relay to the solenoid of said first solenoid-operated water valve, whereby upon closing of said cold water temperature function switch, an electrical circuit through said solenoid is closed thereby opening said first solenoid operated water valve, (z) twelfth wiring means electrically connecting the output of said second relay to the solenoid of said second solenoid-operated water valve, whereby upon closing of said warm water temperature function switch, an electrical circuit through said solenoid is closed thereby opening said second solenoid operated water valve, (aa) whereby upon closing of said lukewarm water temperature function switch, electrical circuits through the solenoids of said first and second solenoid-operated water valves are closed thereby opening both said first and second solenoid-operated water valves, (ab) thirteenth wiring means electrically connecting the output of said third relay to the solenoid of said third solenoid-operated water valve, whereby upon closing of said hot water temperature function switch, an electrical circuit through said solenoid is closed thereby opening said third solenoid operated water valve, (ac) first conduit means communicating with the inlet of said first solenoid-operated water valve and adapted to be connected to a source of cold water, (ad) second conduit means communicating with the inlet of said third solenoid-operated water valve and adapted to be connected to a source of hot water (ae) third conduit means communicating between said first conduit means and the inlet of said second solenoid operated water valve, (af) fourth conduit means communicating between said third conduit means and the inlet of said second solenoid-operated water valve, (ag) fifth conduit means communicating with the outlets of said first, second and third solenoid-operated water valves and adapted to deliver cold, lukewarm, warm or hot water to a bath, shower or the like in response to closing of the appropriate function switch of the highest priority.

2. Apparatus as in claim 1, further comprising:

(ah) key-operated means to permit or selectively to prevent the delivery of hot water to the bath, shower or the like.

3. Apparatus as in claim 1, further comprising:

(ah) a key operated electrical switch interposed between said hot water temperature function switch and said third relay to permit or selectively to prevent the delivery of hot water to the bath, shower or the like.

4. Apparatus as in claim 1, further comprising:

(ah) a key-operated electrical switch positioned in said tenth means to permit or selectively to prevent the delivery of hot water to the bath, shower or the like.

5. Apparatus as in claim 1, further comprising:

(ah) flow detector means mounted in said fifth conduit means and adapted to sense if water has ceased flowing through said fifth conduit means, (ai) a timer circuit, (aj) fourteenth wiring means electrically connecting said timer circuit to said flow detector means, (ak) fifteenth wiring means electricallY connecting said timer circuit to said reset pulse circuit, whereby, after the passage of a preset period of time from the moment the flow detector means senses no flow of water through said fifth conduit means, the timer circuit will send a signal to said reset pulse circuit which, in turn, will clear the memory circuit and shut off all water valves.

6. Apparatus as in claim 1, further comprising:

(ah) a first transistor operatively positioned in said seventh wiring means between said ninth wiring means and said first relay, the base of said first transistor being connected to that part of said seventh wiring means communicating with that output of said integrated circuit logic unit corresponding to said cold water temperature function switch, the collector of said first transistor being connected to that part of said seventh wiring means communicating with said first relay, (ai) a second transistor operatively positioned in said eighth wiring means between said ninth wiring means and said second relay, the base of said second transistor being connected to that part of said eighth wiring means communicating with that output of said integrated circuit logic unit corresponding to said warm water temperature function switch, the collector of said second transistor being connected to that part of said eighth wiring means communicating with said second relay, (aj) a third transistor operatively positioned in said tenth wiring means, the base of said third transistor being connected to that part of said tenth wiring means communicating with that output of said integrated circuit logic unit corresponding to said hot water temperature function switch, the collector of said third transistor being connected to that part of said tenth wiring means communicating with said third relay, (ak) grounding means grounding the emitters of said first, second and third transistors.

7. Apparatus as in claim 1, further comprising:

(ah) first diode means in said seventh wiring means positioned to permit current flow in said seventh wiring means from said integrated circuit logic unit and to prevent current flow in the opposite direction, (ai) second diode means in said eighth wiring means positioned to permit current flow in said eighth wiring means from said integrated circuit logic unit and to prevent current flow in the opposite direction,
(aj) third diode means in said ninth wiring means positioned to permit current flow in said ninth wiring means from said integrated circuit logic unit and to prevent current flow in the opposite direction,
(ak) fourth diode means in said tenth wiring means positioned to permit current flow in said tenth wiring means from said integrated circuit logic unit and to prevent current flow in the opposite direction, 8. Apparatus as in claim 1, further comprising:
(ah) a switch contact debouncer integrated circuit operatively positioned between said function switches and the inputs of said memory circuit, to clean up contact noise resulting from the operation of said function switches and to suppress any extraneous electrical interference, 9. Apparatus as in claim 8, further comprising:
(ai) an inverter integrated circuit operatively positioned between said switch contact debouncer integrated circuit and the inputs of said memory circuit to reverse voltages emanating from said seventh contact debouncer integrated circuit as a result of the operation of said function switches.

* * * * *